May 24, 1938.  H. HOHMANN  2,118,559
DIRECTION AND POSITION INDICATOR FOR MOTOR VEHICLES
Filed June 11, 1936   5 Sheets-Sheet 2
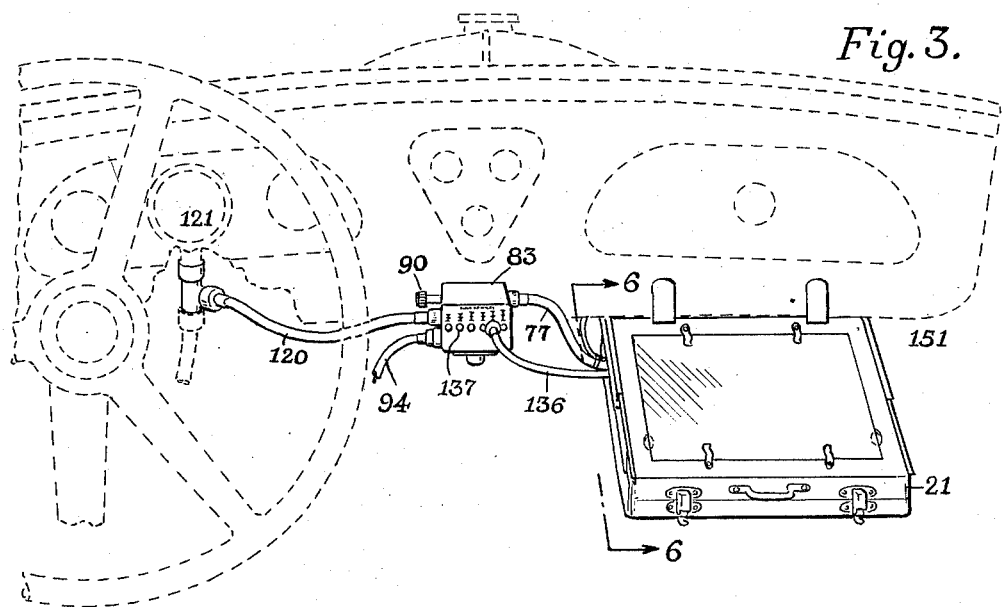
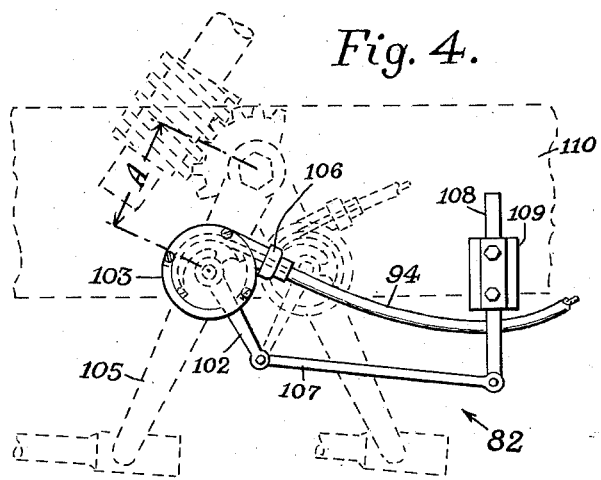
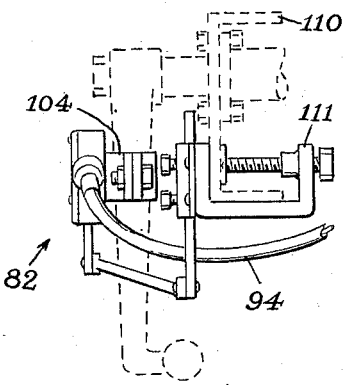
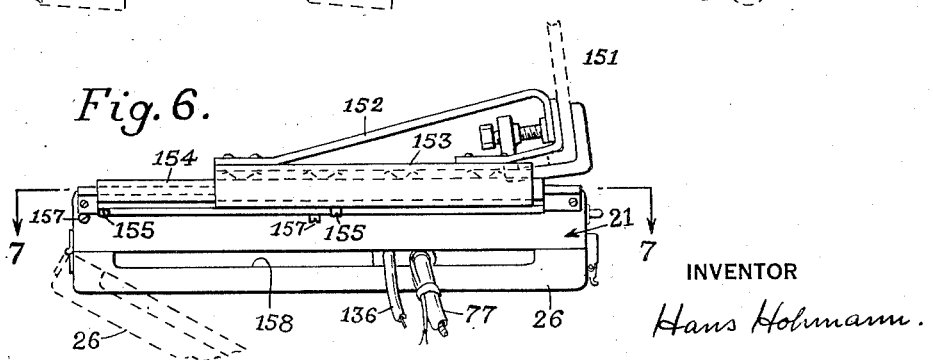
INVENTOR
Hans Hohmann.

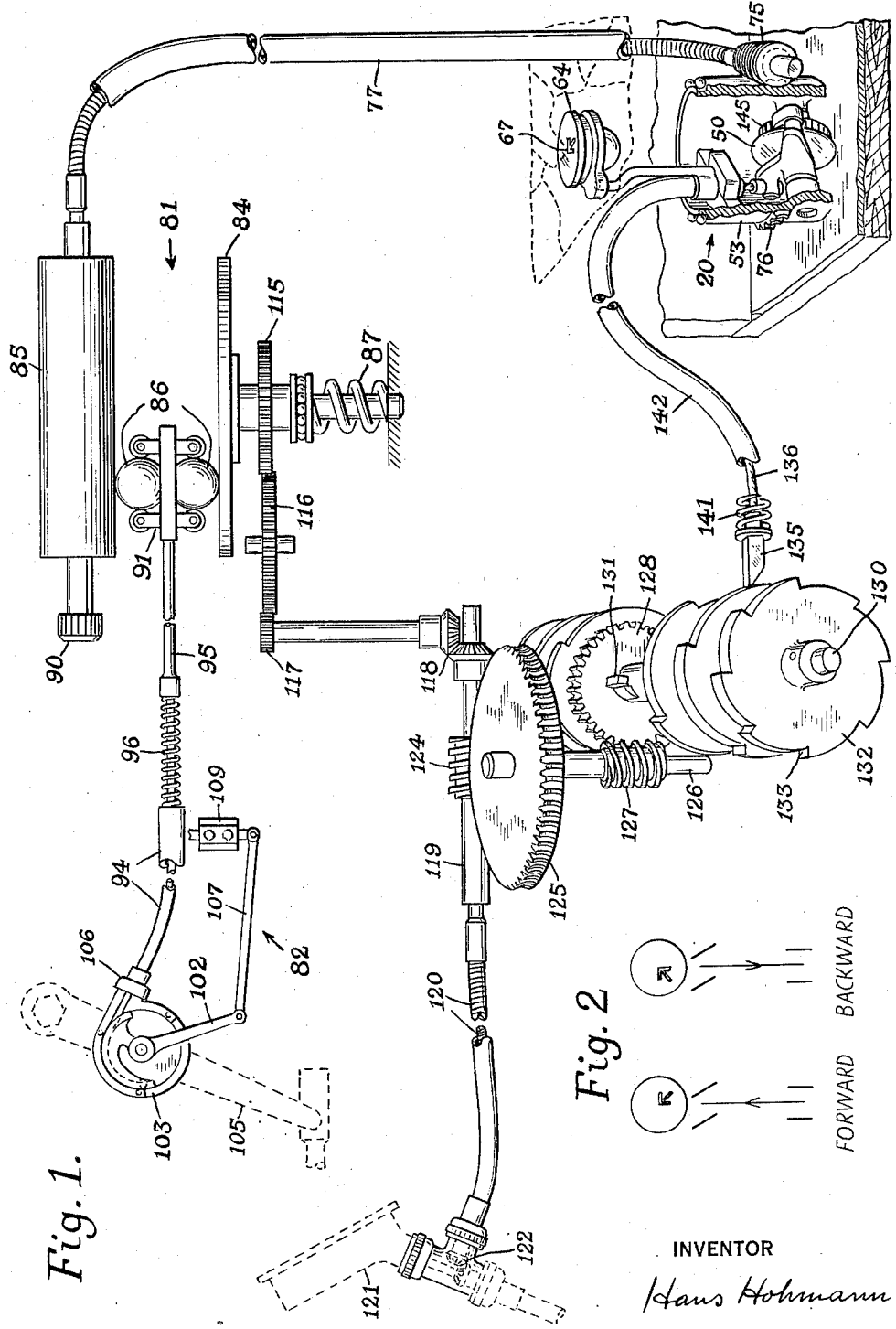

May 24, 1938.  H. HOHMANN  2,118,559
DIRECTION AND POSITION INDICATOR FOR MOTOR VEHICLES
Filed June 11, 1936    5 Sheets-Sheet 3

INVENTOR
Hans Hohmann.

May 24, 1938.  H. HOHMANN  2,118,559
DIRECTION AND POSITION INDICATOR FOR MOTOR VEHICLES
Filed June 11, 1936  5 Sheets-Sheet 4
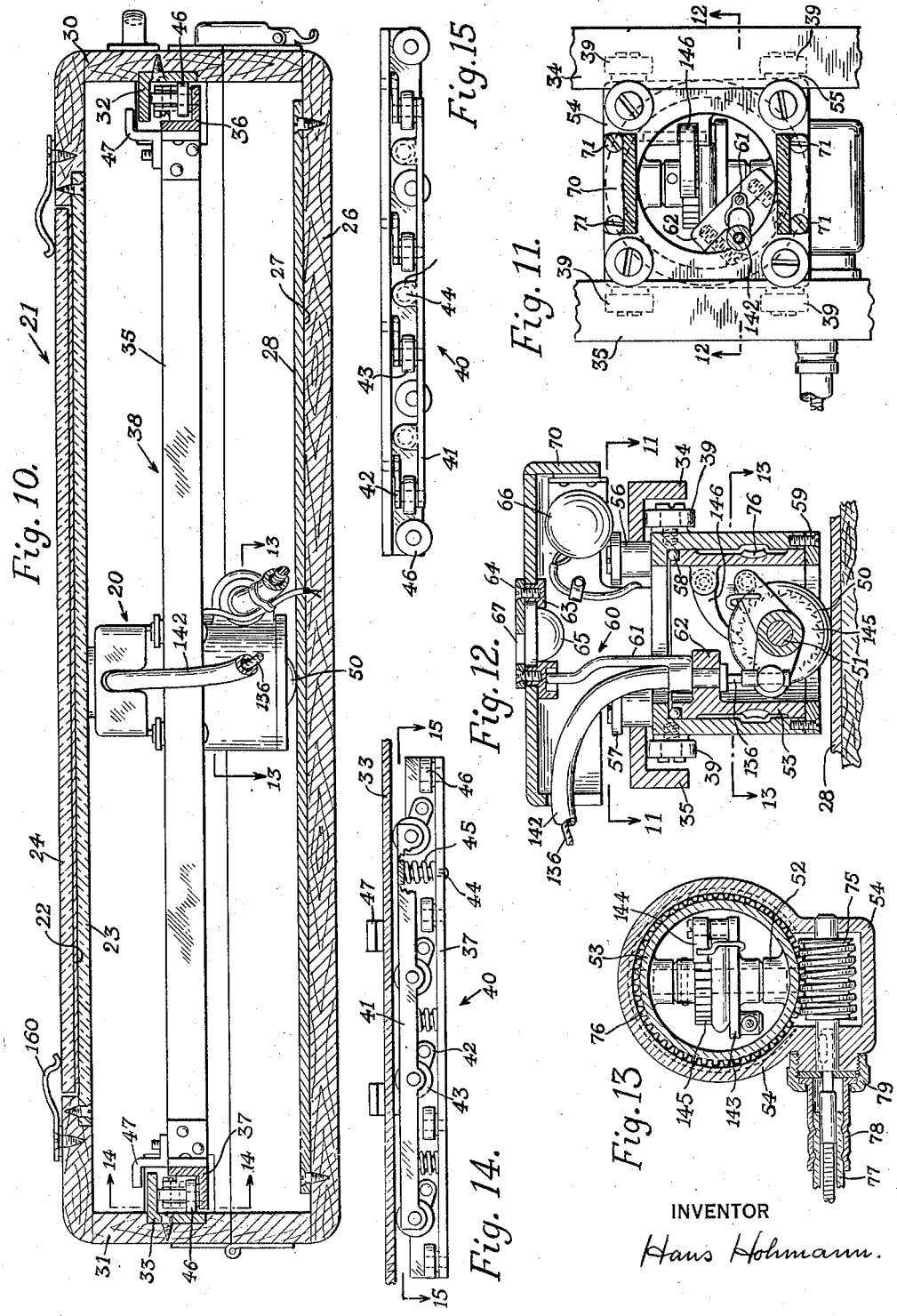
INVENTOR
Hans Hohmann.

May 24, 1938.  H. HOHMANN  2,118,559

DIRECTION AND POSITION INDICATOR FOR MOTOR VEHICLES

Filed June 11, 1936  5 Sheets-Sheet 5

INVENTOR
Hans Hohmann.

Patented May 24, 1938

2,118,559

UNITED STATES PATENT OFFICE 2,118,559

DIRECTION AND POSITION INDICATOR FOR MOTOR VEHICLES

Hans Hohmann, New York, N. Y.

Application June 11, 1936, Serial No. 84,627

27 Claims. (Cl. 40—42)

This invention relates to a direction and position indicator located in a motor vehicle. Indicators of this type serve the purpose to point out on a road map to the driver, the geographical location of his vehicle on the road and the progress he is making in his travel. Indicators previously shown and described in patent literature are of either the semi-manually operated or the automatically operated type. The latter, which is the more preferable, generally comprises a mechanism operated by the motor vehicle to work in unison with a slow moving road map provided for indicating purposes. The road map is therefore caused to travel past a stationary pointer at a speed which is proportionate to that of the vehicle.

In providing and employing a movable and specially prepared road map in an indicator of this type, certain difficulties and discrepancies arise. They not alone affect the cost of operation but also disclose certain defects in accurately and correctly indicating the vehicle's position. This is due to the pointer or arrow, designating or pointing in only a single, instead of several directions.

The pointer indicates therefore only different positions but not different directions of the vehicle. The inconvenience thus caused is that the driver will not readily discern on the usually specially prepared map, the angular or curved movements which the vehicle is bound to make during its travel.

It is therefore one of the main objects of my invention to provide an indicator for motor vehicles which will indicate on a road map not alone the position of the vehicle but also the direction it is taking during its travel. This means that whereas in former indicators the indication of the vehicle's position was given only along a straight line or one direction on the road map, the present invention provides an indicating mechanism wherein the vehicle's travel in any direction is clearly shown and pointed out to the driver or other occupants of the vehicle.

It is another object of my invention to employ a road map (for this indicator) of any standard make purchaseable on the market, and to insert the map or a part thereof into a suitable mounting or housing wherein it is visible in its entirety and easily interchanged for another map.

A further object is to maintain the road map stationary and have its pointer movable to indicate both the position and direction of the vehicle.

Another object of this invention is to provide a mechanism that can be readily manipulated, regulated and adjusted while the vehicle is in motion.

Other objects will be referred to in the description to follow and more particularly in the annexed claims.

The invention is illustrated in the accompanying drawings in which:

Fig. 1 is a diagrammatic view of the direction and position indicating mechanism showing its connection with the respective steering and speed devices of the motor vehicle.

Fig. 2 shows two diagrammatic views of an automobile making a turn while moving either forward or backward and the location of the operable indicator showing the direction of the road.

Fig. 3 shows the assembled indicating mechanism mounted to the dash board of an automobile, preferably to the right of the steering wheel.

Fig. 4 shows a front view of a conventional steering wheel lever of an automobile connected with a device for operating a flexible rod leading to the indicating mechanism.

Fig. 5 is a side view of the arrangement shown in Fig. 4.

Fig. 6 is a side view of the map and indicator housing, mounted to the dash board of the automobile and pushed drawer like underneath the dash board when not required.

Figure 7:
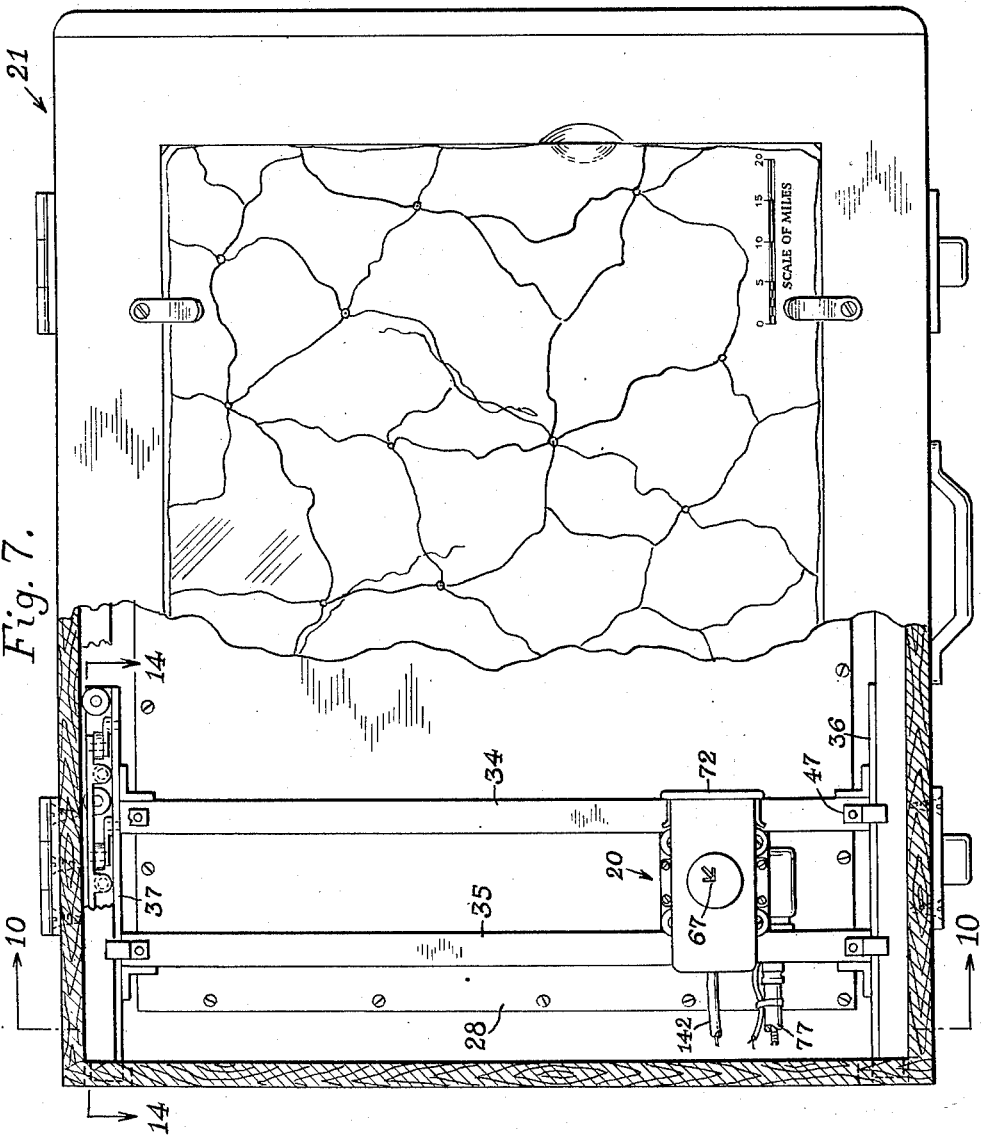
Fig. 7 shows a top view of the map and indicator housing.

Fig. 10 discloses a sectional side view of the map and indicator housing on line 10—10 Fig. 7.

Fig. 11 is a sectional top view of the indicator device on line 11—11 Fig. 12.

Fig. 12 shows a sectional side elevation of the indicator device on line 12—12 Fig. 11.

Fig. 13 is a sectional top view of the lower part of the indicator device on line 13—13 Figs. 10 and 12.

Fig. 14 discloses a back view of a rail mechanism on line 14—14 Figs. 7 and 10.

Fig. 15 is a top view of the rail mechanism on line 15—15 Fig. 14.

Figure 16:
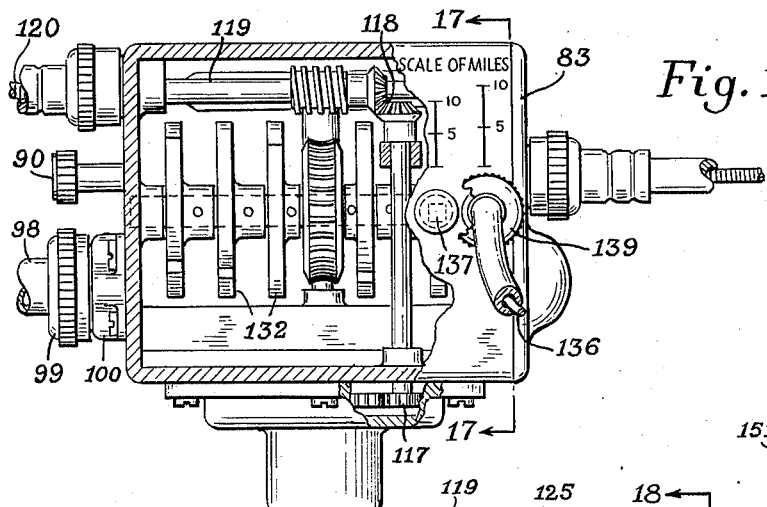

Fig. 16 is the front view of a motion and direction control mechanism.

Figure 17:
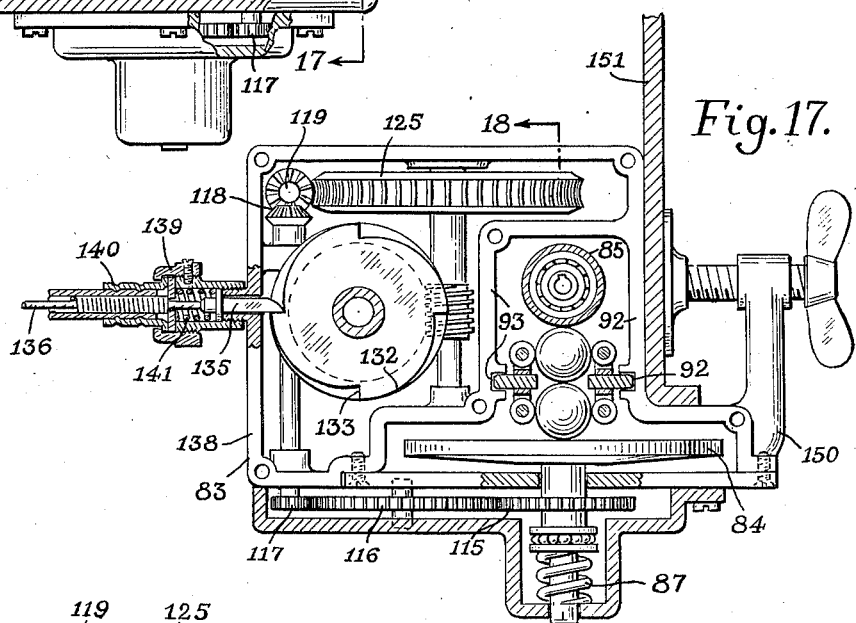

Fig. 17 shows a sectional side view of same on line 17—17 Fig. 16.

Figure 18:
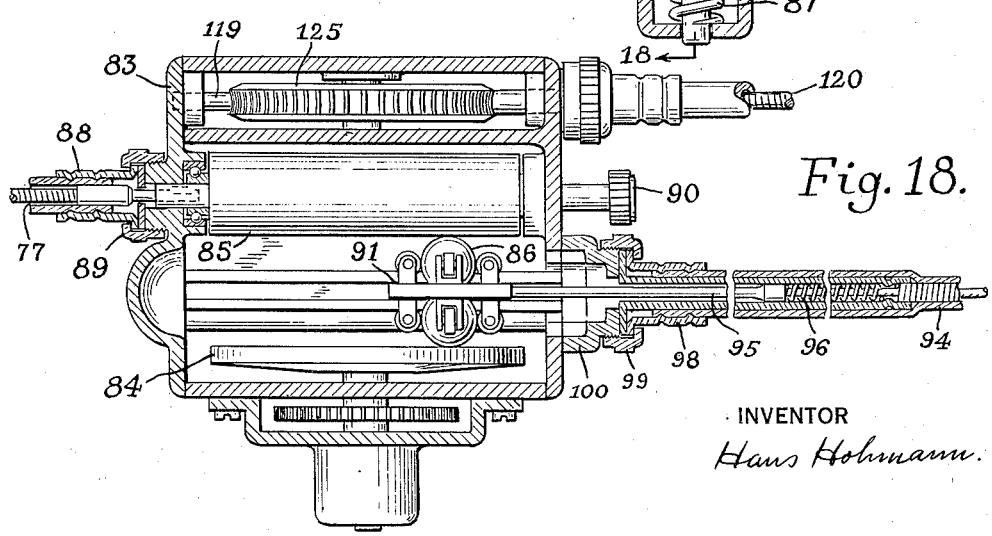

Fig. 18 is a sectional back view of this mechanism on line 18—18 Fig. 17.

In carrying out my invention I provide two fundamental operating and control mechanisms or devices which are the motion control and the direction control mechanism of the indicator or pointer. The pointer, preferably made in the shape of an arrow, represents the motor vehicle and exactly imitates its movement (and direction of motion) at a greatly reduced rate of speed, which is in proportion to the size or scale of the road map over which the pointer travels.

The direction control influences the arrow to point always in the direction of the vehicle's forward movement relative to its location on the road or its geographical position.

The direction of a vehicle and consequently that of the pointer in their forward movements is manifested always in three ways, in that the arrow may point to the left, to the right or straight ahead, depending on the respective locations of the steering wheel and the consequent position of the front wheels of the automobile.

If for instance the arrow points to the left during an extended period of its travel, it will indicate that the front wheels are turned left at the same time and that the vehicle is describing a curve during this extended period.

If the arrow does not deviate from its original position and is maintained at a constant angular location to the left, it would indicate that the vehicle is describing a circle, as will be pointed out in more detail later on.

The present invention is therefore provided with an effective direction control, connected to the steering mechanism of the vehicle which can follow a straight or a curved line on a road map, as will be described in more detail hereafter.

The motion control for the pointer or arrow, preferably driven by the speedometer of the vehicle, includes a speed-change control, which is employed for the purpose of imparting to the moving pointer a definitely selected speed. The latter's magnitude is dependent on the size of the road map or the scale to which it is drawn. Since my invention provides that standard road maps are to be used for indicating purposes, and since these maps are drawn to different scales, it is evident that the speed of the pointer must be made to correspond to the scale to which a selected map is drawn.

It is consequently necessary to provide this motion control of the pointer with the above mentioned suitable speed-change control which permits the selection of a definite speed for the pointer in proportion to the distances to be covered on the map.

In carrying out the various objects of my invention, the mechanisms shown in the drawings comprise a desirable construction and arrangement of parts, which shall be described and explained in detail presently.

The indicator device 20, Fig. 1, which is shown in constructional detail in Figs. 11, 12, 13, is movably held in the map and indicator housing 21 Figs. 7 and 10. The top portion of this housing has a conventional standard road map 22, located above the indicator device 20, and held between two glass plates 23, 24. The lower portion of this housing comprises a hinged bottom part 26, provided with one or more snap locks. This bottom part has fast to its inner surface 27, a metal plate 28, which substantially covers the bottom surface 27.

To the inner surfaces of the respective front and rear side walls 30, 31, of casing 21, are rigidly mounted angle pieces of metal forming respective tracks 32, 33. The indicator device 20 is supported by rails 34, 35, and freely movable therebetween.

Both guide rails are kept separated and are rigidly joined at their ends by suitable angles or cross pieces 36, 37, Fig. 10.

These cross pieces, in conjunction with the guide rail, form a rectangular frame 38 which rests on four rollers 39 of the indicator device 20, Figs. 11 and 12.

Frame 38 is pressed against rollers 39 by two spring devices 40, located on cross pieces 36, 37 and comprising each a roller bar 41, Fig. 14, which is hinged by suitable levers 42. The latter are movably held on the inner or the shorter upright surface of each of the angular cross pieces 36, 37 and maintain a series of rollers 43 in conjunction with bar 41.

Guide parts 44 fast to cross pieces 36, 37, maintain compression springs 45, which press these cross pieces upward and thus cause rollers 43 to contact with the inner or the shorter horizontal surfaces of the angular shaped tracks 32, 33.

Both spring devices 40 will therefore press frame 38 against the four rollers 39 of the indicating device 20. Rollers 46, Fig. 14, rotatably mounted on the inner or the shorter surface of each cross piece 36, 37, touch the inner or shorter vertical surfaces of the respective angular tracks 32, 33, thereby maintaining frame 38 in a relatively fixed location in a longitudinal direction, permitting the same to move only laterally with the indicator device 20.

Frame 38 has fastened to each of its end parts suitable hooks or lashes 47 which prevent frame 38 from falling out of the casing 21 whenever the hinged bottom part 26 is lowered.

The indicating device 20 comprises a hardened steel wheel 50, Fig. 12, which is centrally mounted on a shaft 51, held in bearings 52, located on the inner surface of a cylindrical wheel housing 53, Figs. 11 and 13. The latter is rotatably held within a partly cylindrical indicator housing 54, provided at its top portion with bosses 55, to which are rotatably fastened rollers 39. At the top surface of housing 54 are rotatably held four guide rollers 56, to definitely locate this housing relative to the guide rails 34, 35, of frame 38. Flanges 57 of rollers 56 prevent the indicator housing from dropping out of frame 38 whenever the bottom part 36 is lowered.

Under normal condition, the metal plate 28 will press against the indicator wheel 50, which in turn will press the wheel housing 53 against the balls 58, which are located between the upper surface of the wheel housing and the lower inner surface of the top portion of the indicator housing 54. The latter will thus be pressed against frame 38 which, as previously described, is thus pressed against the rails 32, 33, of casing 21. The lower surface of indicator housing 54 is provided with a ring 59, to retain the wheel housing 53 in position when the hinged part 26 of the casing 21 is lowered. The indicating device 20 also comprises a pointer device 60, which has a stem 61, fastened in suitable manner to a bearing 62, and set off from the center. The upper end of stem 61 engages a circular frame 63, fastened to an arrow or pointer disc 64, underneath which is held a lens 65, to throw the light from an incandescent lamp 66 through the arrow-formed opening 67 of disc 64, onto the back surface of the road map 22. The point of the arrow 67 is at the geometrical center of the disc 64 and remains fixed although a rotation of the disk will change the position of the arrow.

Pointer disc 64 is rotatably held in a bracket or hut 70, fastened with screws 71 Fig. 11 to the upper surface of the slidable indicator housing 54.

Figure 8:
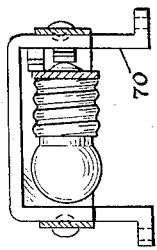
Fig. 8 is a side view of an electric bulb mounting.
Figure 9:
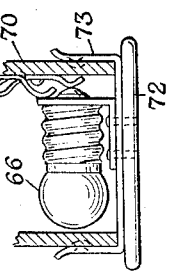
Fig. 9 is a top view of this bulb mounting.

The electric bulb 66 is held in an interchangeable bracket 72 Figs. 8, 9, which can be made to snap onto a side wall of hut 70 by means of flat springs 73 or in any other suitable manner known to those skilled in this art.

The wheel housing 53 with its pointer device 60 is rotated by a worm 75, Figs. 1 and 13, engaging a worm gear 76 forming a part of the housing 53. Worm 75, rotatably held in the indicator housing 54, is engaged with the keyed end part of a flexible shaft 77, held in a suitable tubular holder 78, which is flanged and held against indicator housing by means of a nut 79.

Flexible shaft 77 is operated and its speed is regulated by a direction control which comprises a stepless variable speed transmission 81 and a reciprocating control device 82, Fig. 1.

The transmission is mounted in the control housing 83, Figs. 17 and 18, and consists of a friction disc 84, a friction roller 85, and the intermediary balls 86, which are pressed against the roller by the disc, and kept under constant pressure by a spring 87.

The hardened roller 85, held in suitable ball bearings, is connected to the other keyed end part of flexible shaft 77, of which its flanged holder 88 is screwed to the control housing by means of a nut 89. The other end of roller 85 is provided with an extension and knurled knob 90 which permits the operator of the vehicle to rotate flexible shaft 77 and through this the pointer disc with arrow 67.

This is required at the time the pointer is to be set relative to a newly inserted road map or it may be set when desiring to make small correction of the arrow's position while the device is operating.

The hardened steel balls 86 are guided in a roller cage 91 of known construction which is supported by the lateral walls 92, 93, of housing 83. Cage 91 is operatively associated with the reciprocation control device 82, Fig. 1, by means of a flexible push and pull rod 94.

This rod is connected with a bar 95 fast to cage 91 which has a compression spring 96 acting against a shoulder of bar 95.

The push and pull rod 94 is mounted in the usual manner by means of a flanged sleeve 98, which a threaded nut 99 maintains on a cap housing 100. The latter is screwed to the outer wall surface of the control housing 83.

The other end of the flexible connector rod 94 is welded into, or fastened in any other suitable manner to, a control lever 102 forming a part of the reciprocating control device 82, Figs. 4 and 5. This lever is fulcrumed in a circular casing 103. The latter is provided with a clamp 104, wherewith to fasten the casing to the steering arm 105 of the vehicle.

Connector rod 94 enters into the casing 103 through an embrasure, 106, which serves as a guide of the rod during its swinging operation.

The other extension of control lever 102 is connected to a stay rod 107, fulcrumed to an adjustable bar 108. The latter is slidably mounted in a guide piece 109, which is fastened to the automobile frame 110, by means of a suitable clamp 111.

While the steering arm 105 is moving, the connector rod 94 is subjected to two distinct motions. One thereof is a free-swinging motion with no influence on the transmission device 81. The other motion, however, is one which will cause the roller cage 91 to move, due to the fact that the stay rod 107 maintains a fixed position, thereby forcing the lever 102 to rotate and thus change the connector rod's location relative to steering arm 105, as shown in dotted lines in Fig. 4.

Due to differences in gear and lever ratios of the various makes of steering mechanisms in automobiles, the distance A between the centers of the steering arm and the control lever 102 vary in accordance thereto.

It is therefore necessary to clamp the lever housing 103 to the steering arm at a definite location from its center depending on the make of the car. The adjustable bar 108 is to be positioned accordingly.

The driving disc 84 of the transmission device is rotated by suitable gearing 115, 116, 117, connected by miter gears 118, to a worm shaft 119, which is driven by a flexible speed shaft 120, Figs. 1 and 17. The speed shaft 120 is operated by the speedometer 121 of the automobile to which it is connected by suitable gearing 122.

Worm 124 on worm shaft 119 drives worm gear 125 on vertical shaft 126, which is provided with a worm 127 driving a worm gear 128. The latter is rotatably mounted on a cam shaft 130, which is driven by this worm gear through an engaging device 131. By means of this device the cam shaft 130 will be driven in only one direction of rotation but will remain idle for a definite period if worm gear 128 is turned in opposite direction.

Cam shaft 130 drives six or more cam wheels 132, each of which is provided with a set of toothed segments or cams 133. The number of cams differs with each wheel and is made subject to the size and the scale of the road map to be selected. An oscillatable contact finger or plug 135 connected to a flexible rod 136, is operated by one of the cam wheels 132. The finger 135 is inserted and slidably held in one of the plug holes 137 in the front wall 138 of housing 83, Figs. 16 and 17. A threaded nut 139, freely rotatable on a flanged sleeve 140 and screwed against the threaded extension of a plug hole, prevents the contact finger 135 from falling out. A compression spring 141 constantly presses the slidable plug or finger 135 with the rod 136, in the direction towards a cam wheel 132.

The other end of the flexible rod 136 is connected to the wheel mounting of the indicator device 20, Fig. 12. The protective shell or cable 142, surrounding this rod is rotatably held in the bearing 62 of the wheel mounting 53. The end part of the rod 136 is rotatably held in a ratchet lever 143 on shaft 51. The other end of this lever has a spring-operated pawl 144 which engages and drives in its forward movement a ratchet wheel 145. An up and down movement of the oscillating rod 136 will therefore actuate the ratchet wheel and with it the indicator wheel 50. A stop pawl 146 mounted on the inner wall of wheel housing 53, prevents a return movement of the wheel 50. Since the latter is kept under pressure, as previously described, it is evident that a steplike operation of the indicator wheel 50 will move the indicator device 20, and with it the arrow 67, in that direction in which the wheel happens to be rotated.

If this direction is not changed or, in other words, if the wheel housing 53 is not rotated by the worm 75, so that by reason thereof the two steel balls 86 are kept located in the center of the transmission disc 84, Fig. 1, the arrow of the indicator device will operate on a straight line. This is regardless of the direction the indicator wheel 50 assumes relative to the surface of the metal plate 28 on which it is rotated. The arrow underneath the road map may therefore travel on a straight line in all directions of a plane.

It is evident that while the vehicle is in motion, the arrow 67 does move also and will vary its speed with that of the vehicle.

At the moment the steering lever 105 is moved from a neutral location to either the left or to the right, the steel balls 86 will leave the center of the transmission disc 84 and move in a direction corresponding to that in which the steering lever is moved. This will cause the balls 86 to rotate, and with them the transmission cylinder 85, which in consequence thereof will rotate the arrow 67 around its geometrical center and make the same point to either the left or the right relative to its original location.

If therefore the steel balls 86 are not returned to the center of the disc for a certain length of time the arrow will change its location constantly. During this period the arrow makes two distinct movements, one of which is to indicate the motion and speed of the vehicle and the other is to indicate the constant change of direction thereof. It is evident that during these two distinct motions of the arrow, the vehicle must describe a curve and that if the displaced steel balls are kept in one location the curve described by the vehicle must be circular.

The further away the balls are moved from the center of the disc, the sharper the described curve will be.

It was previously stated that the arrow is to indicate only the forward movement of the vehicle. To indicate a backward movement of the vehicle is not considered necessary, because a travel in that direction is made for very short distances and this in exceptional cases only. Due to the great reduction in scale to which the road maps are drawn, the distance traveled backward is so short, that it would not be noticed on a map.

The ratchet wheel 145 and the cam wheels 132 are therefore made to operate in one direction only. Since however the flexible speed shaft 120 will be rotated in reversed direction, when the vehicle moves backward, the various gears connected thereto will rotate in a reversed direction also. In this case the worm gear 128, due to the single directed engaging device 131, will operate idly and will not rotate the cam wheels 132.

While the backward motion of a vehicle need not be, and consequently is not being, shown, the direction of a turning motion of the vehicle during a backward movement is, however, indicated by the arrow 67. This, as diagrammatically shown in Fig. 2, is due to the fact that a reversed movement of the speed shaft 120 will also reverse the direction of the transmission disc 84, which in turn will reverse the direction of the arrow 67, whenever the steering lever 105 is operated. If, therefore, the front wheels of a vehicle are steered to the left, as shown in Fig. 2, the arrow 67 will also point left, if the vehicle moves forward, but it will point to the right if the movement is backward which means that the front wheels move toward the right.

The housing 83 of the speed and direction control is provided with a suitable clamp device 150, Fig. 17, whereby to fasten this housing to the dash board 151 of the vehicle Fig. 3.

The map and indicator housing 21, maintaining the road map, is preferably mounted to the dash board of the vehicle by means of two clamp devices 152, Fig. 6, which are provided with channels 153. The latter are engaged by slidable channel 154 with stop posts or screws 155 to limit their movement in both directions. The slidable channels are engaged by angle pieces 156 which are mounted to the outer side-walls of the upper portion of the map housing 21. The screw heads 157 will limit the movement of the casing relative to the channel pieces 154.

With the slidable arrangement described, it is thus possible to move the casing with its road map from underneath the dash board whenever needed and to move it out of the way when not desired.

The lower portion 26 of the road map casing is provided with a long slot-like opening 158, Fig. 6, to permit the cables 120, 136 to move to and fro.

When desiring to displace a road map for another, the operator will switch or turn to one side the spring-like clamps 160, mounted on the top frame of map housing 21. Thereafter, the top glass plate is removed; the new map is laid flat on the lower glass plate 23, the top plate is inserted and the clamps 160 are relocated.

To position the arrow 67 relative to a definite location on the map, the operator will see to it that the electric bulb 66 is burning so as to notice the position of the arrow underneath the map. The lower part 26 of map housing 21 is then swung downward and the indicator device 20 is moved by hand. The arrow may thus be located on any selected point shown on the map. The lower part 26 of map housing is thereafter raised and replaced into its original and normal position.

One more operation is required which is that of setting the arrow relative to the direction in which it is to point. The operator will therefore rotate knob 90, extending from the housing 83, Fig. 3, which in turn will cause the wheel housing 53 to operate and turn the arrow 67 in the direction desired.

It is evident that this same knob may also be turned by hand while the operator is driving. This may be necessary whenever a slight correction in the arrow's location relative to its direction is required.

The size of the road map is preferably 8 to 12 inches square or rectangular, depending on the size of the road map housing.

A 10 inch road map, drawn to a scale of one inch per 50 miles will therefore show 500 miles in a straight line and if the automobile is to travel 50 miles per hour, the lighted arrow will travel along the selected roadline at the rate of one inch per hour. The roadline on the map, if drawn to a scale of say one inch per 25 miles, will be traveled over by the arrow at the rate of one inch per one-half hour or two inches per one hour, if the automobile has the same speed of 50 miles per hour.

It is evident that the road map may be positioned in any desired locations, regardless of the four corners of the road map housing. A part may even be cut out from a large sized map and be inserted into the housing, regardless of its outer contour.

While my invention discloses only a single form and embodiment of a direction and position indicator for motor vehicles, it is understood that various modifications thereof may be apparent to those skilled in the art without departing from the spirit and scope of my invention and it is therefore understood that the same is only to be limited by the scope of the prior art and the appended claims.

I claim:

1. In a direction and position indicator located in a motor vehicle, a stationary road map visible to the occupant of the vehicle, means comprising a linear-formed indicator of which its extent gives the direction, while one of its extremities notes a place on a road line on said map, which line represents a road on which the vehicle is located and further means adapted to move said pointing means in different directions and to successively rotate said pointing means on its axis, whereby to respectively indicate on said road line the movement as well as the direction of movement of the vehicle on the road.

2. In a direction and position indicator located in a motor vehicle, a road map visible to the occupant of the vehicle, means to point at a road line on said map, which line represents a road on which the vehicle is located, means to operate said pointing means, to indicate on said road line the movement, as well as the direction of movement of the vehicle on the road and a speed selecting device, wherefrom to pick a selected speed for said pointing means, which speed is to correspond to one required when the road map is substituted for another drawn to a different scale.

3. In a direction and position indicator located in a motor vehicle, a road map visible to the occupant of the vehicle, means comprising a linear-formed indicator, of which its extent gives the direction, while one of its extremities notes a place on a road line of said map, which line represents a road on which the vehicle is located, means adapted to move said pointing means in different directions and to successively rotate said pointing means on its axis, whereby to respectively indicate on said road line the movement as well as the direction of forward movement of the vehicle on the road and further means to adjust the position of the pointing means in regard to its location relative to said map.

4. In a direction and position indicator located in a motor vehicle, a road map visible to the occupant of the vehicle, means comprising a linear formed indicator to point at a road line on said map, which line represents a road on which the vehicle is located, means to operate said pointing means, to indicate on said road line the movement as well as the direction of movement of the vehicle on the road and further means for successively adjusting the position of the pointing means while operating.

5. An indicating mechanism for motor vehicles, comprising a road map and a movable indicator for said road map and mechanically actuated means adapted to move said indicator at a speed proportionate to the speed of the vehicle, said mechanically actuated means being further adapted to move said indicator into all directions of a plane and to successively rotate the same on its axis and thereby direct said indicator so as to point at and to follow on said road map a selected road line having more than one direction.

6. An indicating mechanism for motor vehicles, comprising a road map and a movable linear-formed indicator for said road map and mechanically actuated means adapted to move said indicator at a speed proportionate to the speed of the vehicle, said mechanically actuated means being further adapted to move said indicator in successive steps of predetermined length into all directions of a plane and to successively rotate the same on its axis and thereby direct said indicator so as to point at and to follow on said road map a selected road line having more than one direction.

7. An indicating mechanism for motor vehicles, comprising a road map and a movable indicator for said road map and mechanically actuated means adapted to move said indicator at a speed proportionate to the speed of the vehicle, said mechanically actuated means being further adapted to move said indicator into all directions of a plane and to successively rotate the same on its axis and thereby direct said indicator, so as to indicate on the map the location of the vehicle relative to the road and to follow on said road map a curved road line, which represents a curved road on which the vehicle travels.

8. An indicating mechanism for motor vehicles, comprising a stationary road map and a movable indicator for said road map, comprising a linear-shaped pointer means to change the geographical direction of said pointer and means to move said indicator bodily and independent of said change means at a speed proportionate to the speed of the vehicle and further means to change the course of said indicator from a straight to a diverted direction while at the same time changing the direction of its pointer relative to the road line on the map, in imitation of the change of direction of the vehicle, said changing means comprising a variable speed device and a flexible control of same operatively connected to the steering mechanism of the motor vehicle.

9. An indicating mechanism for motor vehicles, comprising a road map and a movable indicator for said road map, means to move said indicator at a speed proportionate to the speed of the vehicle and further means to change the course of said indicator from a straight to a diverted direction, corresponding to the change of direction of the vehicle, said changing means comprising a variable speed device and a flexible control operatively connected to the steering mechanism of the motor vehicle in proportionate relation to the change in directive movement of the vehicle, said flexible control comprising an adjustable lever, and means for adjusting said lever.

10. An indicating mechanism for motor vehicles, comprising a road map and a movable indicator for said road map, means to move said indicator at a speed proportionate to the speed of the vehicle and further means to change the course of said indicator from a straight to a diverted direction, corresponding to the change of direction of the vehicle, said changing means comprising a variable speed device, an oscillatable connector forming part of said device, and a flexible control, said control being operatively associated with the steering mechanism of the motor vehicle, and comprising an adjustable lever and means for adjusting said lever.

11. In a mechanism of the character described and located in a motor vehicle, a road map and a pointer for said road map, a friction surface, a rotatable device maintaining said pointer, a friction wheel movably held against said friction surface and associated with said rotatable device mechanically actuated, means to successively rotate said device with said pointer in proportionate relation to the change in angular movement of the vehicle and further mechanically actuated means to turn said friction wheel, whereby to move said device and said pointer in proportionate relation with the speed of the motor vehicle.

12. In a mechanism of the character described and located in a motor vehicle, a road map and a pointer for said road map, a friction surface, a rotatable device maintaining said pointer, a friction wheel movably held against said friction surface and associated with said rotatable device, means to rotate said device with said pointer in proportionate relation to the change in angular movement of the vehicle, means to turn said friction wheel, whereby to move said device and said pointer in proportionate relation with the speed of the motor vehicle and further means to select a different speed for said friction wheel, whereby to change the proportionate relation with the speed of the vehicle, when said road map is substituted for one drawn to a different scale.

13. In a mechanism of the character described, and located in a motor vehicle, a road map and a pointer for said road map, a friction surface, a rotatable device maintaining said pointer, a friction wheel movably held against said friction surface and associated with said rotatable device mechanically actuated, means to successively rotate said device with said pointer, in proportionate relation to the change in angular movement of the vehicle and further mechanically actuated means to turn said friction wheel in successive steps, whereby to move said device and said pointer in proportionate relation with the speed of the motor vehicle.

14. A mechanism of the character described, located in a motor vehicle, comprising a road map and an indicator having a perforated and illuminated pointer, located underneath said road map, said indicator comprising a linear-formed pointer of which its extent gives the direction, while one of its extremities is positioned to note a place on a road line of said map and means adapted to move, as well as direct the movement of said pointer along a road line on said map, in proportionate relation with the related speed and the angular movement of the motor vehicle.

15. A mechanism of the character described, located in a motor vehicle, and comprising a housing, a road map therein, a movable pointer, means, connected to the speed indicator and the steering mechanism of the vehicle, to move said pointer, respectively direct the movement of said pointer along a road line on said map, in proportionate relation with the related speed and angular movement of the motor vehicle and further means adapted to displace said housing from a position in which its pointer may be observed to one where the pointer is out of sight, while maintaining the connection with the speed indicator and the steering mechanism of the vehicle.

16. In a mechanism of the character described, a map housing and a map indicator device in said housing and means to support and to guide said device during its movement, said device comprising an indicator housing and a friction wheel support rotatably held in said indicator housing, a friction wheel rotatably mounted in said wheel support and contacting with a surface of said map housing, means to drive said friction wheel for a movement of said wheel support and said indicator housing in either direction of a plane, a pointer device maintained in the geometrical centre of and operatively associated with said wheel support and mechanically actuated operating means to rotate said wheel support in said indicator housing.

17. In a mechanism of the character described, a map housing and a map indicator device in said housing and means to support and to guide said device during its movement, said device comprising an indicator housing, an electric light shield at its top and a friction wheel support rotatably held in said indicator housing, a pointer device rotatable in said light shield and means to illuminate said pointer device, a friction wheel rotatably mounted in said wheel support and contacting with a surface of said map housing, means to actuate said friction wheel for a movement of said wheel support and said indicator housing in either direction of a plane, said pointer device being operatively associated with and in the geometrical centre of said wheel support and further means for rotating said wheel support and thereby directing said friction wheel.

18. In a mechanism of the character described, a map housing and a map indicator device in said housing and means to support and to guide said device during its movement, said device comprising an indicator housing and a friction wheel support rotatably held in said indicator housing, a friction wheel rotatably mounted in said wheel support and contacting with a surface of said map housing, means to drive said friction wheel in one direction of rotation for a movement of said wheel support and said indicator housing on a plane, a rotatable pointer device maintained in the geometrical centre of and operatively associated with said wheel support and mechanically actuated operating means for rotating said wheel support in both directions, and thereby steering said friction wheel in any direction of a plane.

19. In a mechanism of the character described, a road map visible to the occupant of the vehicle in which the mechanism is located, means to point at a road line on said map, which line represents a road on which the vehicle is located, means to operate said pointing means, to indicate on said road line the movement, as well as the direction of movement of the vehicle on the road and a speed selecting device, wherefrom to pick a selected speed for said pointing means, which speed is to correspond to one required when the map is substituted for another drawn to a different scale, said selecting device comprising a series of rotatable cam wheels and an oscillatable contact finger selectively locatable against the cam surfaces of either one of said pointing means which is operatively associated with said contact finger.

20. In a mechanism of the character described, a stationary road map, axially operable means to point at a road line on said map, means for automatically rotating the axis of and for imparting a linear movement to said pointing means and hand operable adjusting means for rotatably adjusting the pointing means on its axis relative to the automatic rotation of said pointing means.

21. In a mechanism of the character described, a stationary road map, axially operable means to point at a road line on said map, means for automatically rotating the axis of and for imparting a linear movement to said pointing means, hand operable adjusting means for rotatably adjusting the pointing means on its axis relative to the automatic rotation of said pointing means and a speed selecting device for the control of magnitude of the linear movement of said pointing means.

22. In a mechanism of the character described, a map housing, a stationary road map therein, a movable pointer and means adapted to operate said pointer to follow a road line on said map, said map housing comprising a withdrawable bottom part, for permitting an approach to said pointer and to said operating means from without.

23. A mechanism of the character described, comprising a map housing, means to slidably maintain said housing to a wall of a motor vehicle, a stationary road map in said housing, a movable pointer and means adapted to operate said pointer to follow a roadline on said map, said map housing comprising a withdrawable bottom part, for permitting an approach to said pointer and to said operating means from without.

24. In a mechanism of the character described, a map housing, a stationary road map therein, a movable pointer, means adapted to operate said pointer to follow a road line on said map and a speed selecting device operatively associated with said pointer, said speed selecting device showing a legend for each selectable speed, each legend comprising a scale, having a length proportionate to the size of the map to be used.

25. In a direction and position indicator located in a motor vehicle, a stationary road map visible to the occupant of the vehicle, an indicator, comprising a perforated pointer to point at a road line on said map, an electric bulb to illuminate said indicator, and a lens, located underneath said pointer to transmit a concentrated light beam through its perforation onto the map and further means adapted to move said indicator with said lens in different directions, to indicate on said road map the movement as well as direction of movement of the vehicle on the road.

26. In a mechanism of the character described, a map housing, a stationary road map therein, a movable pointer and means adapted to operate said pointer to follow a road line on said map, said map housing comprising a withdrawable bottom part adapted to produce a pressure on said operating means, for the operation thereof.

27. In a vehicle on a road, a map having a line corresponding to said road, means to visibly indicate on said corresponding road line the vehicle's geometrical position and the direction of travel of said vehicle, mechanically actuated operating means for moving said indicating means in relation to the movement of said vehicle and further means for automatically changing during its movement the direction of said indicating means in definite relation to a change in direction of said vehicle on the actual road.

HANS HOHMANN.